United States Patent [19]

Kirch

[11] Patent Number: 4,954,230

[45] Date of Patent: Sep. 4, 1990

[54] DECONTAMINATION OF WASTE WATER

[75] Inventor: Rudolf Kirch, Immenstaad, Fed. Rep. of Germany

[73] Assignee: Dornier System GmbH, Friedrichshafen, Fed. Rep. of Germany

[21] Appl. No.: 160,324

[22] Filed: Feb. 24, 1988

[30] Foreign Application Priority Data

Feb. 25, 1987 [DE] Fed. Rep. of Germany ....... 3705956

[51] Int. Cl.$^5$ .............................................. C02F 1/46
[52] U.S. Cl. ................................................... 204/149
[58] Field of Search ................................ 204/140, 149

[56] References Cited

U.S. PATENT DOCUMENTS

| | | | |
|---|---|---|---|
| 3,756,932 | 9/1973 | Zievers | 204/149 |
| 3,764,499 | 10/1973 | Okubo | 204/149 |
| 4,144,149 | 3/1979 | Bollhalder | 204/149 |
| 4,218,315 | 8/1980 | Hartkorn | 204/149 |

Primary Examiner—T. M. Tufariello
Attorney, Agent, or Firm—Ralf H. Siegemund

[57] ABSTRACT

Heavy metal and oxidizable contaminants are removed from waste water by electrolysis to obtain metallic precipitation of the heavy metal on a stainless steel cathode while simultaneously other contaminants are oxidized on a lead oxide coated titanium or graphite anode; certain additives may be used to break up complex components; subsequently the partially decontaminated electrolyte is passed through an adsorber column for further removal of said contaminants.

7 Claims, No Drawings

DECONTAMINATION OF WASTE WATER

BACKGROUND OF THE INVENTION

The present invention relates to the removal of heavy metal as well as oxidizable contaminants from waste water. In particular the invention relates to a method for separating heavy metals as well as oxidizable contaminants from waste water under conditions which permit electrolytic treatment of the waste water followed by an adsorptive treatment.

Industries which use extensive treatment of metallic surfaces, produce a variety of waste water including various heavy metals while on the other hand many organic and/or inorganic, complex forming compounds as well as organic components of the tensile variety are also included. Usually only the higher concentration waste water e.g. spent baths and flushing liquids are treated with large quantities of rinsing and flushing water for reducing the concentration of the contaminants prior to discharge into the local sewer system. To remove the contaminants one needs a large amount of chemicals according to which a heavy metal slurry is produced. This slurry can still not be added to the conventional slurry of waste water sewer disposal or storm and rain system, simply owing to the heavy content in heavy metals. The slurry must be treated separately, including depositing and chemical treatment which is of course an expensive procedure. On the other hand no matter what the treatment is, it loads the environment to some extent or at least establishes potentially a significant danger. It is also known to provide under certain conditions an electrolytic oxidation of anionic contaminants but as the concentration drops their removal becomes difficult so that a complete removal of these contaminants is not possible.

DESCRIPTION OF THE INVENTION

It is an object of the present invention to provide a new and improved method for removing heavy metal and other inorganic as well as organic contaminants from concentrated waste water.

It is a feature of the invention to remove the bulk of all these contaminants simultaneously.

It is a specific object of the invention to eliminate, in an economic fashion, all those contaminants which are the result of metal surface processing.

It is a further feature of the present invention to avoid the formation of a heavy metal slurry and to provide for a decontamination of the various contaminating compounds so that their concentration drops well below permissible levels as far as industrial waste water is generally concerned. Also, diaphragms and ion exchange membranes are to be avoided.

In accordance with the preferred embodiment of the present invention the objects are obtained under observance of the above stated features in that an electrolytic treatment is provided (i) causing the heavy metals to precipitate in a cathodic operation, as pure metal, while (ii) simultaneously other contaminants are oxidized on the anode of the electrolysis so that the thus treated electrolyte whose content in contaminants is being reduced and is subsequently residually decontaminated in an adsorptive process to remove any residual contaminants. It is very significant that the invention can be practiced at ordinary room temperature and normal ambient pressure. In other words heating or cooling or pressurization or a vacuum are not needed.

The anode used in the electrolytic bulk decontamination is preferably a special lead oxide coated Ti or graphite element; the cathode is preferably stainless steel. In order to gain access to heavy metals which are bonded in a complex fashion for instance in alkaline waste water, so as to permit electrolytic treatment it is necessary to split larger heavy metal complexes of that kind and to bind them into weaker ones. The amount of material needed here which can be used as a de-and-recomplexing medium and depends upon the total heavy metal concentration, and on the chemical kind of complex forming agent and its concentration as originally contained in the waste water. The de-and-recomplexing medium is e.g. 25% ammonia water and is added either continuously or intermittenly, e.g. once every hour, and in specific quantities to the electrolytic bath. Examples here will be given more fully below.

Throughout the treatment period the additives should not exceed a 0.3% concentration in the waste water. The de-and-recomplexing medium such as ammonia waste is suitable compound since the resulting ammoniacal heavy metal complex is not stable and, therefore, is easily accessible for purposes of removal through electrolytes. After 10 hours the electrolytic treatment can be stopped and now, if necessary the de-and-re-complexing material and/or a chemical oxidation medium such as 35% $H_2O_2$ solution is added and replenished. The thus treated waste water is run through a special adsorber, RMW column being an acronym for (Reclaiming of Metal from Waste water). That column includes adsorbing agents such as an ion exchanger and adsorber resins or active carbon.

Waste water treated in this manner is completely decontaminated, beyond known prescribed limits for decontamination whereby specifically the heavy metal concentration is practically removed. Several electrolytic operating modules preferably operate in series in order to process larger quantities of waste water. The waste water is circulated about 100 times per hour by means of an external pump.

The proposed method uses e.g. active carbon as an adsorber. Depending on the material to be treated, different qualities of carbon can be used whereby porosity and pore structure may be important features. Adsorber resin such as ion exchanger on the basis of a synthetic resin such as polystyrol, polyacryl with functional sulfonic acid, carbonic acid or aminogroups. The de-and-recomplexing medium as stated is ammonia but other hydroxides such as NaOH or KOH can be used. Also useful are pyrophosphates and polyphosphates, possibly even triethanolamine and various kinds of organic carbonic acids. Oxidizing media are e.g. hydrochloride, peroxidisulfate, perchlorate or ozone. However, the latter has unfavorable side effects; for that reason ozone may not be usable.

The inventive method as it involves an electrolytic process followed by adsorption permits in fact a complete elimination of all those contaminants which are found in the waste water, discharged from metal treatment plants' surfaces. The method is quite economical. Herein an particular aspect is to be seen in the simultaneous separation of heavy metal and anionic contaminants within the electrolytic stage and as part of the same electrolytic process. The adsorber column merely removes any residue. This quite economic waste water treatment permits the reduction of contaminants below those permissible by law.

EXAMPLE 1.

Assuming the waste water is spent electrolyte, degreasing bath produced by in and from a galvanizing factory this spent bath has e.g. a very strong cyanide content. In addition the following heavy metals can be found at various concentrations Cu, Ni, Cd, Cr, Zn, Sn, Fe which are either directly present or contained in complex compounds. It is also assumed that the total concentration in such metals amounts to 5.5 g/l and the cyanides have a concentration of 60 g/l. In addition tensides and tenside residue is contained in the bath. Tensides are generally compounds which lower the surface tension particularly of water and are found e.g. in detergents. They increase wettability. Sulfuric acid ester, aminosalts, ammonia salts, fatty acid alkyl ester, carbonic acic and other compounds are contaminants of the surface tension reducing variety. The total contaminant content, therefore, of an in the spent bath was on the order to 170000 ppm, extractable oil was present at an amount of 60 ppm.

This liquidous contaminant was treated for 10 hours in an electrolytic bath in accordance with the present invention, under a cathodic current density of 2.6 $A/dm^2$ and an anodic current density of 4.4 $A/dm^2$. Following this 10 hour treatment the heavy metal that dropped to a total concentration of below 100 ppm. The metal was cathodically precipitated. Simultaneously the excess complex medium cyanide had oxidized on the anode, thereby almost completely forming cyanate under formation of carbon dioxide and nitrogen. The residual cyanide concentration had the same order, 10 ppm, as the metal. The reduction in contaminants therefore exceeds 96% with reference to the original concentration value under consideration of the chemical oxygen requirement. After about 3 ml or 25% ammonia water as well as 3 ml 25% $H_2O_2$ has added the thus treated waste water was then passed through an RMW column for the type outlined above and here a further significant drop in contaminant content obtained.

EXAMPLE 2.

In this case scrubbing water for smoke gas had to be cleansed whereby through oxidation and/or condensation process (SIROK) the scrubbing water contained nitride as well as heavy metal. That waste water was treated in accordance with the method of the present invention. The nitride was originally present at a concentration of 1.5 g/l and the total amount of heavy metal (Ni, Zn, Cu, Cr, Fe) concentration was 400 ppm.

During the electrolytic waste water treatment, for six hours, the nitride content dropped below 10 ppm and the heavy metal was cathodically removed so that its concentration dropped to about 80 ppm. In this case actually any de-and-recomplexing medium did not have to be added. Following this treatment the scrubbing water was fed to an RMW column and the concentration for heavy metal did in fact drop to very insignificant values.

The invention is not limited to the embodiments described above but all changes and modifications thereof, not constituting departures from the spirit and scope of the invention, are intended to be included.

I claim:

1. Method for removing heavy metal in particular cadmium, nickel, copper, tin and zinc and oxidizable contaminants in particular tensides, cyanides, and nitrides from waste water in a combined cathodic/anodic process comprising the steps of; electrolytically treating said waste water to obtain metallic precipitation of the heavy metal on a cathode while simultaneously other contaminants are anodic oxidized;

using an anode being lead oxide coated Ti or graphite and a cathode made of stainless steel; and passing the partially decontaminated electrolyte of the electrolytic treatment through an adsorber for further removal of said contaminants.

2. Method as in claim 1 including intermittently adding compounds to break up heavy metal containing complexes.

3. Method as in claim 2 including the step of adding concentrated ammonia water.

4. Method as in claim 1 including the step of intermittently adding an oxidizer.

5. Method as in claim 1 and including the step, to be carried out subsequently to the electrolytic process but prior to the adsorbing adding de-and-re-complexing substances.

6. Method as in claim 1 wherein following the electrolytic treatment but prior to adsorbing an oxidizer is added.

7. Method as in claim 5, the oxidizer being about 35% $H_2O_2$ solution.

* * * * *